Sept. 15, 1931.   L. H. KAUPKE   1,823,548
TWO-ROW CULTIVATOR
Filed April 27, 1928   3 Sheets-Sheet 3
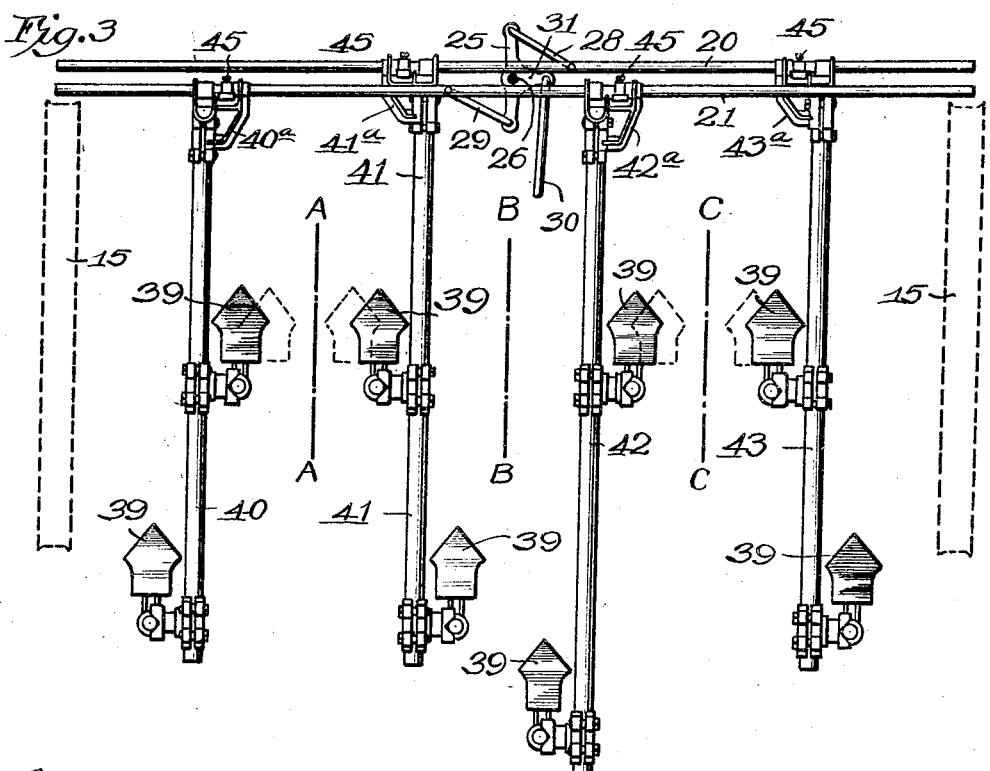
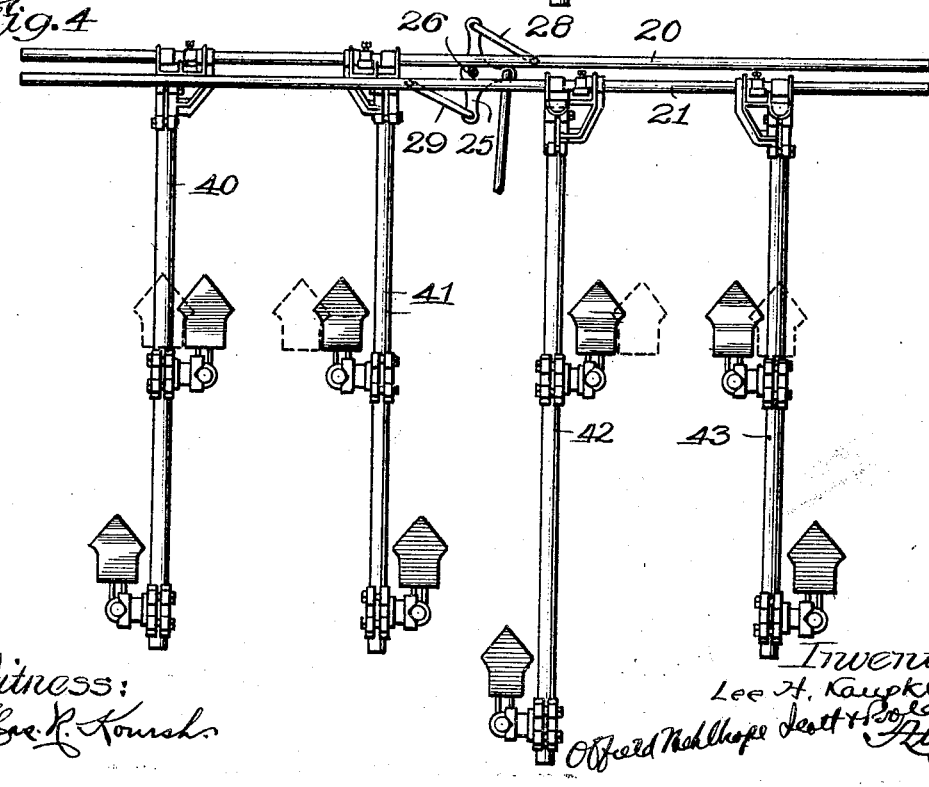

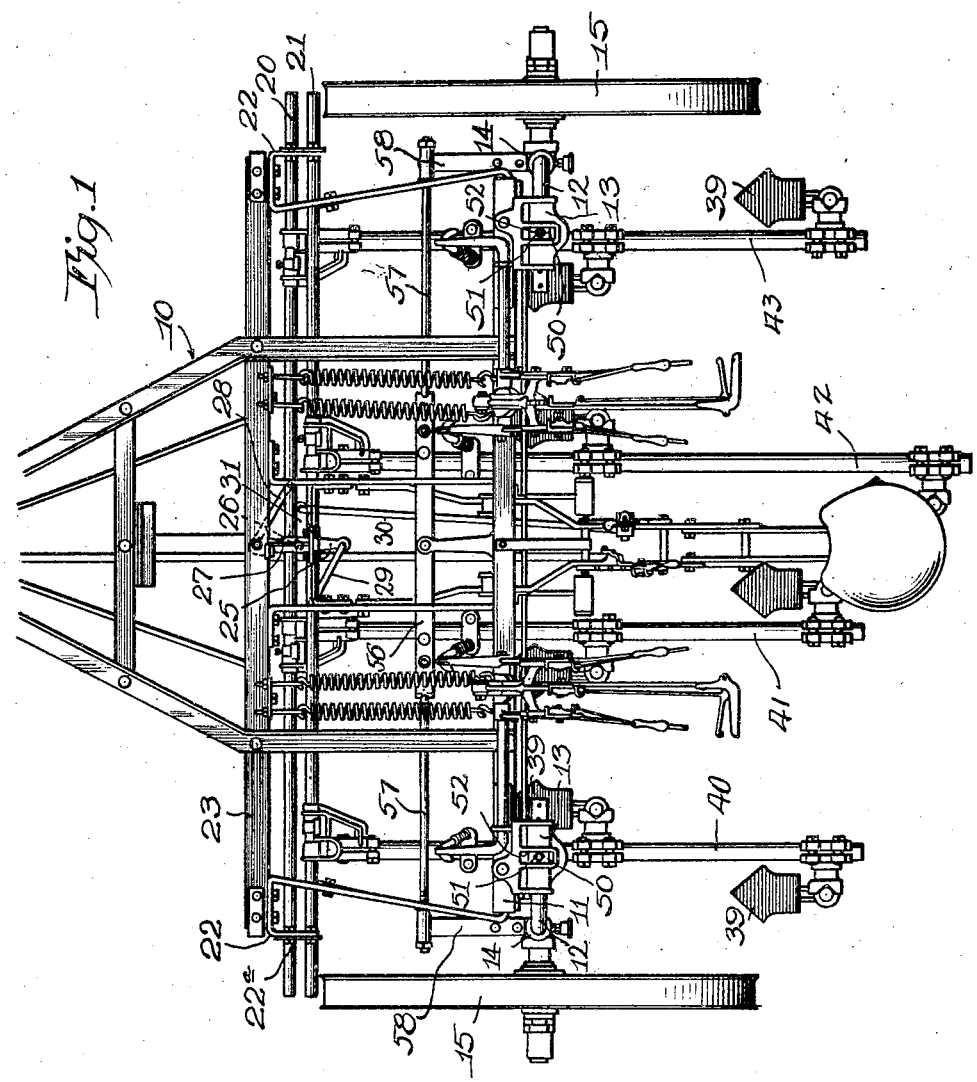

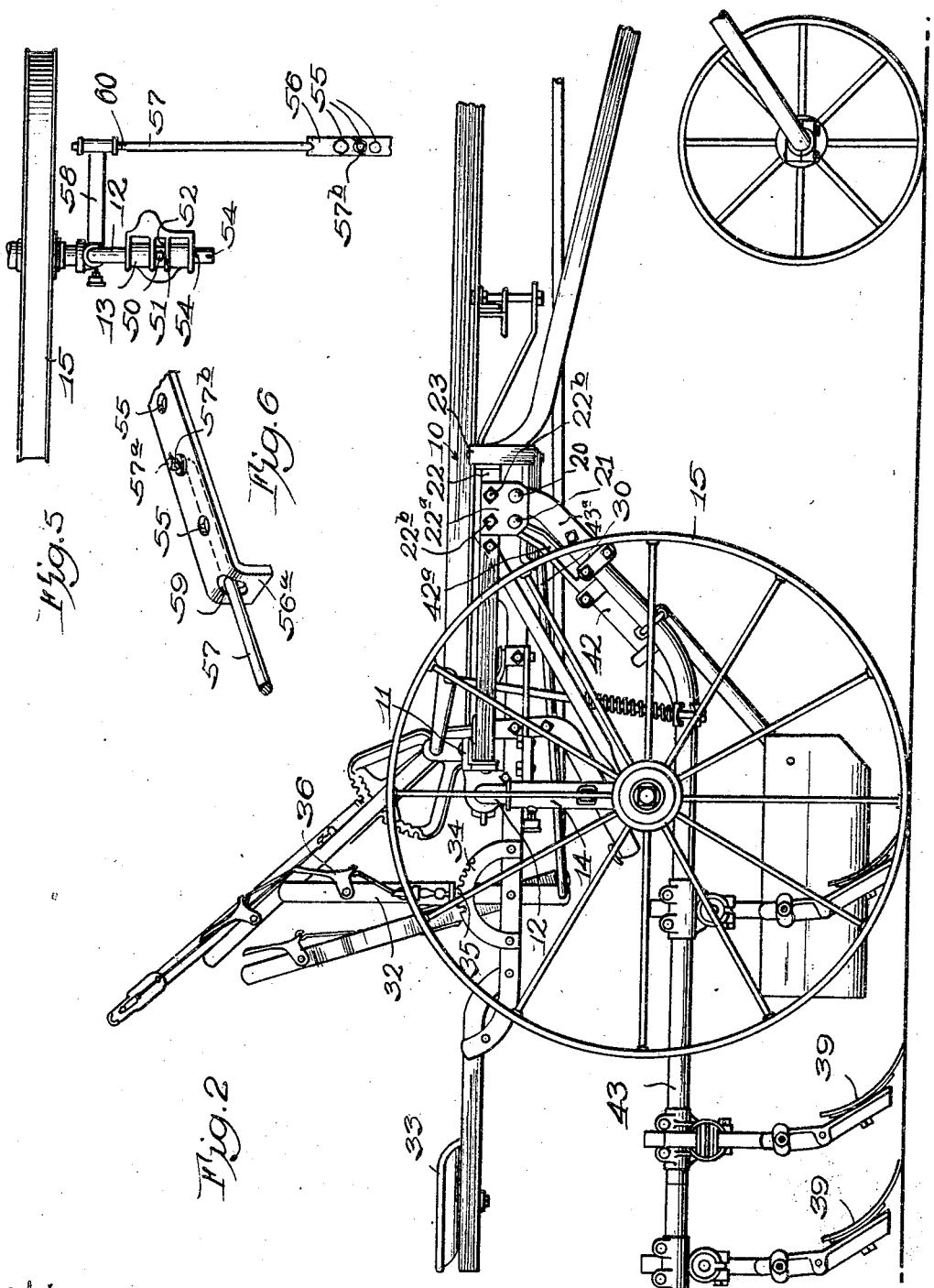

Patented Sept. 15, 1931

1,823,548

UNITED STATES PATENT OFFICE

LEE H. KAUPKE, OF ROCK ISLAND, ILLINOIS, ASSIGNOR TO THE ROCK ISLAND PLOW COMPANY, OF ROCK ISLAND, ILLINOIS, A CORPORATION OF ILLINOIS

TWO-ROW CULTIVATOR

Application filed April 27, 1928. Serial No. 273,209.

This invention relates to improvements in cultivators, and more particularly to two-row cultivators, and has for its principal object to provide an improved device of the character described where duplicate sets or pairs of cultivator gangs are arranged on opposite sides of the center, and said gangs are readily adjustable either for moving the gangs of each pair on opposite sides toward and away from each other, or for moving the two pairs as a unit toward or away from the center of the cultivator.

Other objects of the invention will appear from time to time as the description proceeds.

The invention may best be understood by reference to the accompanying drawings, in which Figure 1 is a plan view of a cultivator constructed in accordance with my invention.

Figure 2 is an enlarged side view of the cultivator shown in Figure 1 with the front portions broken away.

Figure 3 is a detail view showing the arrangement of the draft bars and cultivator gangs mounted thereon so as to shift each pair of gangs at opposite sides of the center line toward and away from each other.

Figure 4 is a view similar to Figure 3 but in which the cultivator gangs are re-arranged on the draft bars so that each pair of gangs may be shifted as a unit toward and away from the center of the cultivator.

Figure 5 is a detail plan view showing means for adjusting the width of tread of the cultivator.

Figure 6 is an enlarged perspective view showing the adjusting means for the tie bar used in varying the width of tread.

Referring now to details of construction shown in the drawings, it will be understood that my invention is directed particularly to that type of cultivator of sufficient width to span two separate rows, and to this end is provided with two sets or pairs of tool carrying gangs, the two pairs being arranged on opposite sides of the center line of draft of the cultivator.

In the embodiment herein illustrated, the cultivator consists of a main frame 10 including a main transverse frame member 11 having bail axles 12—12 connected at opposite ends thereof. Said bail axles are mounted in brackets 13—13 connected to the frame member 11, the outer ends of said axles being bent downwardly and having steering sleeves 14—14 having wheels 15—15 pivotally mounted thereon for steering movement. The connections for steering the wheels will hereinafter more fully appear.

Referring now more particularly to the adjustable gangs and the means for mounting them upon the main frame, I provide a pair of draft bars 20, 21 supported in transverse parallel relation adjacent each other near the forward end of the main frame 10 and overlapping each other so that both extend substantially the full width of said frame, herein being supported on brackets 22—22 at opposite ends of a transverse frame member 23 forming part of the main frame 10. The two draft bars 20 and 21 are mounted for relative shifting movement transversely of the frame, in the form herein shown this shifting movement being imparted to them by means of a lever 25 on a pivot pin 26 projecting downwardly from a supporting bracket 27 at the center of the main frame just behind the transverse frame member 23, as is best shown in Figures 1, 3 and 4. The lever 25 normally extends in position longitudinally of the main frame and has a link 28 pivotally connected between the forward end thereof and a part of the front draft bar 20 to one side of the lever 25. A similar connection is made between the rear end of the lever 25 and the rear draft bar 21 by link 29, extending in the opposite direction from the companion link 28.

The lever 25 is controlled by rod 30 connected to a bell crank arm 31 extending at right angles from the axis of the lever 25. Any suitable means for controlling the shifting of the lever 25 may be provided, herein consisting of a hand lever 32 pivotally mounted on the main frame adjacent the driver's seat 33 and provided with a suitable notched locking segment 34 and latch 35 controlled in the usual manner by a spring pressed hand release member 36. The arrangement is such that by moving the control lever 32 in a forward direction the lever 25 will be pivotally swung in a clockwise direction so as to shift the front draft bar 20 to the right and the rear draft bar 21 to the left, as seen in Figures 1, 3 and 4. Similarly, when the lever 32 is rocked rearwardly, the two draft bars 20 and 21 will be shifted in the opposite direction respectively.

Figure 3 illustrates the arrangement for mounting the cultivator gangs on the draft bars when cultivating two rows which are substantially parallel, but in which it is desired to shift the gangs of each pair toward or away from their respective rows of plants.

The cultivator gangs constituting one pair herein referred to, are indicated at 40, 41 and are provided with the usual shovels 39—39 of any suitable design. In this arrangement the gang 40 is provided with a bracket 40a at its forward end which is connected to the rearward draft bar 21. The gang 41 is provided with a bracket 41a similar to the bracket 40a but connected to the forward draft bar 20, as clearly shown. Thus when the lever 25 is rocked so as to shift the draft bars 20 and 21 longitudinally of each other, it will be seen that the gangs 40 and 41 with their shovels may be adjusted to various widths relative to each other, but that the mean distance between the two gangs, representing the line of the row being cultivated, and herein indicated by the line A—A, will be maintained at a uniform distance from the center line of draft B—B of the cultivator at all times.

Similarly, the pair of gangs 42 and 43 on the opposite side of the center line B—B is arranged so that the inner gang 42 has its bracket 42a mounted on the rear draft bar 21, while the outer gang 43 has its bracket 43a mounted on the forward draft bar 20. Longitudinal shifting of the draft bars 20 and 21 will therefore cause the gangs 42 and 43 to be moved toward and away from the line C—C, representing the position of the second row to be cultivated, but the line C—C will be maintained at all times at equal distance from the center line of draft B—B of the cultivator.

It will be understood, of course, that the gangs may be given an initial adjustment longitudinally of their respective draft bars 20 and 21 by means of set screws 45—45, so as to accommodate the cultivator to the proper width between adjacent rows, represented by the distance between the lines A—A and C—C, but after this initial adjustment the cultivator may be operated in the usual manner and any desired nicety of adjustment of the two pairs of gangs relative to their respective rows may be afforded by manipulation of the hand lever 32.

The arrangement of gangs illustrated in Figure 4 is more particularly designed for use where the lines of the adjacent rows are not substantially parallel, and it is therefore desirable to vary the width of the center lines between each pair of gangs on opposite sides of the machine. In order to accomplish this purpose, each pair of gangs on one side of the cultivator is re-arranged so as to be mounted on one of the draft bars, while the other pair of gangs is placed on the other draft bar. Thus in Figure 4, the gangs 40 and 41 are re-arranged so that both are mounted on the front draft bar 20 while the gangs 42 and 43 are both mounted on the rear draft bar 21. This arrangement is readily afforded in the construction shown, by removing the end bearing plates 22a, 22a carried on the supporting brackets 22, 22 on each side of the machine, as is best shown in Figures 1 and 2. Each bearing plate is suitably secured by bolts 22b and when removed permit the bearing plate 22a to be removed from the end of the bars 20 and 21. Thereupon the gangs may be interchanged as desired on the bars 20 and 21, and the end plates replaced.

It will be observed that with the two draft bars 20 and 21 arranged in mutually overlapping position and both extending substantially the full width of the frame, the gangs may be interchanged from one draft bar to the other so as to be given entirely different lateral movements relative to each other, although they may normally be disposed in substantially the same lateral positions or paths in either interchangeable arrangement.

It will be observed further that it is only necessary to change the outside gangs 40 and 43 in order to effect the changed positions shown in Figures 3 and 4. In other words, when the parts are in the position shown in Figure 3, it is only necessary in order to change to the form shown in Figure 4, to remove the outside gang 40 from the rear draft bar 21 and change it to the forward draft bar 20, and similarly remove the opposite outside gang 43 from the front bar 20 and change it to the rear bar 21, as shown in Figure 4. The gangs, of course, are adjustable for various widths along their respective draft bars as before, but in the position shown in Figure 4, longitudinal shifting movement of the draft bars 20 and 21 will now cause each pair of gangs 40 to be shifted sidewise as a unit relative to the opposite pair, as indicated in dotted lines in the latter figure.

I also provide an improved construction and arrangement for adjusting the wheel tread of the cultivator, as may sometimes be necessary when shifting or changing the relative positions of the gangs or for any other purpose. In the form shown, this means consists in permitting the bail axle 12, 12 to shift horizontally a limited distance in the brackets 13—13 before described. A sleeve 50 provided with a set screw 51 is mounted on the bail axle 12 within a slotted recess 52 formed in the center of the bracket 13, as shown in Figures 1 and 5. The arrangement is such that by loosening the set screw 51 the entire bail axle 12 may be shifted longitudinally of the sleeve 13 to any position of adjustment desired.

In order to afford a proper steering connection between the wheels 15—15 on opposite sides of the vehicle, I provide a tie bar 56 through which the usual steering movement of the two wheels is controlled, said bar having connecting tie rod members 57, 57 connected to the forwardly extending yokes 58 of the steering brackets 14 and the inner end of each of the rods 57 is provided with selective detachable connection in the apertures 55—55. The bail axles 12 are each provided with a series of indicating marks such as punch holes 54, 54, to correspond with the position of adjustment of rods 57 in apertures 55, 55. As shown in Figures 5 and 6, three punch holes 54 are used, and the center punch hole is shown in alignment with the inner end of the bracket 13, while the end of rod 57 is correspondingly engaged in the center aperture 55 on the bar 56.

Any suitable means for providing a selective connection between the bar 56 and rod 57 may be provided, as for instance that shown in Figure 6 in which the outer end 56a of the bar 56 is turned downwardly and provided with a slot 59 through which the rod 57 passes. The extreme end 57a of said rod is turned upwardly and is adapted to engage in one or the other of the apertures 55 and be secured therein by means of a cotter pin 57b or its equivalent.

By affording the tread adjustment at definite intervals as above described, such adjustments may be readily made without effecting the ordinary threaded connection 60 between the ends of the tie rods 57 and yokes 58 which is usually provided for maintaining the wheels 15, 15, in proper alignment with each other.

Although I have illustrated and described one particular embodiment of my invention, it will be understood that I do not wish to be limited to the exact construction shown and described, but that various changes and modifications may be made without departing from the spirit and scope of my invention.

I claim:

1. In a two-row cultivator, a frame having supporting wheels, two draft bars both extending substantially the full width of said frame and movable transversely thereof, and a plurality of pairs of tool carrying gangs interchangeably mounted on one or the other of said draft bars.

2. In a two-row cultivator, a frame having supporting wheels, two draft bars disposed in overlapping parallel relation extending transversely of said frame, means for shifting said bars in opposite directions, and a plurality of tool carrying gangs interchangeably mounted on one or the other of said draft bars.

3. In a two-row cultivator, a frame having supporting wheels, two draft bars disposed in overlapping parallel relation and movable transversely of said frame, bearing means for opposite ends of both of said draft bars detachably connected to opposite sides of said frame and a plurality of tool carrying gangs adapted to be interchangeably mounted on the ends of one or the other of said draft bars, by temporary removal of said bearing means.

4. In a two-row cultivator, a frame having supporting wheels, two draft bars disposed in overlapping parallel relation both extending substantially the full width of said frame, means for simultaneously shifting said bars transversely of said frame in opposite directions, and a plurality of tool carrying gangs interchangeably mounted on one or the other of said draft bars.

5. In a two-row cultivator, a frame having supporting wheels, two draft bars disposed in overlapping parallel relation and movable transversely of said frame, bearing means for opposite ends of both of said draft bars detachably connected to opposite sides of said frame, means for simultaneously shifting said bars in opposite directions, and a plurality of tool carrying gangs adapted to be interchangeably mounted on the ends of one or the other of said draft bars, by temporary removal of said bearing means.

Signed at Chicago, Ill., this 20th day of April, 1928.

LEE H. KAUPKE.